United States Patent [19]

Arai et al.

[11] 4,449,792

[45] May 22, 1984

[54] LARGE-APERTURE SINGLE LENS WITH ASPHERICAL SURFACES

[75] Inventors: Norikazu Arai, Komae; Shozo Ishiyama; Tadashi Kojima, both of Hino, all of Japan

[73] Assignee: Konishiroku Photo Industry Co., Ltd., Tokyo, Japan

[21] Appl. No.: 316,863

[22] Filed: Oct. 30, 1981

[30] Foreign Application Priority Data

Oct. 31, 1980 [JP] Japan .............................. 55-152158

[51] Int. Cl.$^3$ ............................................. G02B 13/08
[52] U.S. Cl. .................................................. 350/432
[58] Field of Search .......................................... 350/432

[56] References Cited

U.S. PATENT DOCUMENTS 4,027,952  6/1977  Hugues ............................... 350/432

Primary Examiner—John K. Corbin
Assistant Examiner—Rebecca D. Gass

Attorney, Agent, or Firm—Jordan B. Bierman; Linda Bierman; C. Cornell Remsen, Jr.

[57] ABSTRACT

A large-aperture single lens with aspherical surfaces to be used as a pickup lens for video disks, especially for tracking the video disk by directly moving the pickup lens. It is preferable that the single lens is made of plastic material in order to make it compact and light in weight. Both refractive surfaces of the single lens are arranged to have positive refractive powers in order to make the working distance of the lens long. Spherical aberration of the single lens is corrected to the degree that the diameter of the circle of confusion thereof is decided approximately by diffraction of light. Both refractive surfaces of the single lens are formed as aspherical surfaces and the shapes of the refractive surfaces are determined so as to correct aberrations including the sine condition to the required range, by taking the error to be caused at the time of manufacture into consideration.

6 Claims, 5 Drawing Figures

LARGE-APERTURE SINGLE LENS WITH ASPHERICAL SURFACES

BACKGROUND OF THE INVENTION (a) Field of the Invention

The present invention relates to an aplanatic single lens of which aberrations are corrected to the degree that the diameter of the circle of confusion thereof is decided approximately by diffraction of light and, more particularly, to a large-aperture single lens with aspherical surfaces of which both surfaces are formed as aspherical surfaces having positive refractive powers.

These types of lenses have a large field of application as various kinds of condensers and, recently, they are attracting attention particularly as the pickup objectives for optical video disks.

(b) Description of the Prior Art

For pickup lenses to be used with video disk reproducing devices employing optical pickups or the like, it is essential that N.A. is 0.4 to 0.5 and aberrations are corrected to the degree that the residual axial aberration comes within the Rayleigh limit, because a resolving power about 1,000 lines/mm is required.

When one tries to arrange such a lens system by glass lenses with spherical surfaces, multiple lenses should be combined as in the case of microscope objectives. Consequently, the overall length of the lens becomes long and it is difficult to make the lens compact and light in weight. Besides, adjustment of eccentricity etc. between multiple lenses becomes complicated and high-accuracy machining is indispensable for the lens tube. Therefore, it is impossible to reduce the cost of the lens due to te above-mentioned reasons. Moreover, as the number of lenses constituting the lens system becomes large, the loss of intensity of light becomes large due to reflection by inner surfaces and absorption, and flare causes unfavourable influence on the S/N ratio of reproducing output.

Recently, as the tracking method for the video disks, the method of directly driving the objective has been adopted instead of the method of swinging a mirror like a galvanometer and, therefore, it is necessary to make the lens compact and light in weight. In this case, however, the axial focal point of the optical system is always utilized and, consequently, it is not necessary to give as much consideration to offaxial aberrations. To meet the above-mentioned requirement, it has been suggested to use a single lens with an aspherical surface (for example, in Japanese published unexamined patent application No. 156945/75). This kind of single lens can be made extremely light in weight by manufacturing it with a plastic material. However, the above-mentioned known lens has disadvantages as described below. That is, as said lens is designed to have the focal length about 7.5 mm, it is impossible to obtain a sufficient working distance when the focal length is made about 4 to 5 mm. Especially, as the second surface is made concave toward the image surface, the working distance on the second surface side becomes short compared with the focal length.

SUMMARY OF THE INVENTION

It is, therefore, a primary object of the present invention to provide a pickup lens system for video disks arranged as a single lens with both surfaces having positive refractive powers, said lens system thereby enabling one to obtain comparatively long back focal length and working distance compared with the focal length thereof, to make the overall length of the lens including the lens tube short, and to make the weight of lens remarkably light. The weight of lens is further reduced when plastic is used as the lens material.

By adequately distributing the refractive powers to the two refractive surfaces of said single lens and by further arranging those refractive surfaces as aspherical surfaces, it is possible to favourably correct aberration of the axial image point including aberration caused by the protective layer with thickness about 1.2 mm, which is generally provided on the video disk surface. Thus, it is possible to obtain a lens with aberrations corrected to the degree that the diameter of the circle of confusion thereof is decided approximately by diffraction of light.

Moreover, by arranging one of aspherical surfaces of the single lens as hyperboloid, it is also possible to correct the sine condition, to simplify the structure of lens tube so that high-accuracy machining is not required so much, and to simplify the centering work.

Besides, by adequately selecting the lens thickness, it is also possible to correct astigmatism. Thus, it is possible to provide a lens which can be used also as an optical pickup lens for a video disk reproducing device which employs the tracking method to swing the galvanometer.

DETAILED DESCRIPTION OF THE PREFERRED EMBODIMENTS

Preferred embodiments of the large-aperture single lens with aspherical surfaces according to the present invention are as described below.

Figure 1:
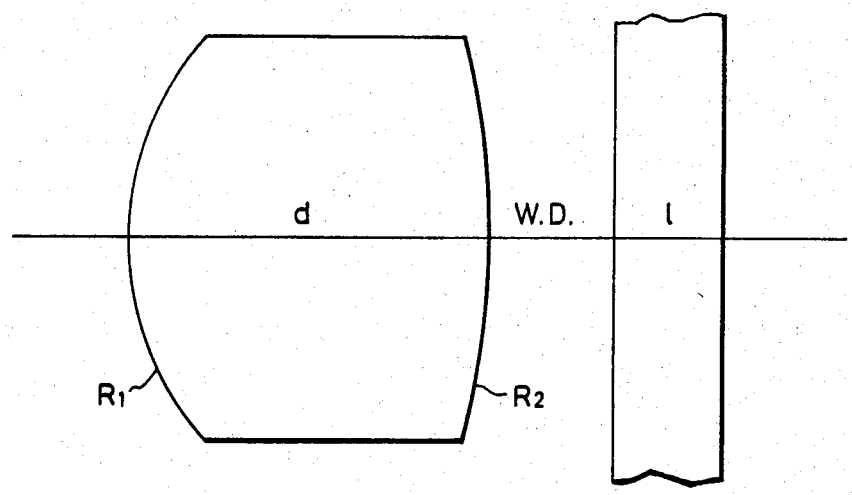
FIG. 1 shows a diagrammatic sectional view illustrating the lens configuration of embodiments of the optical system according to the present invention.
Figure 2:
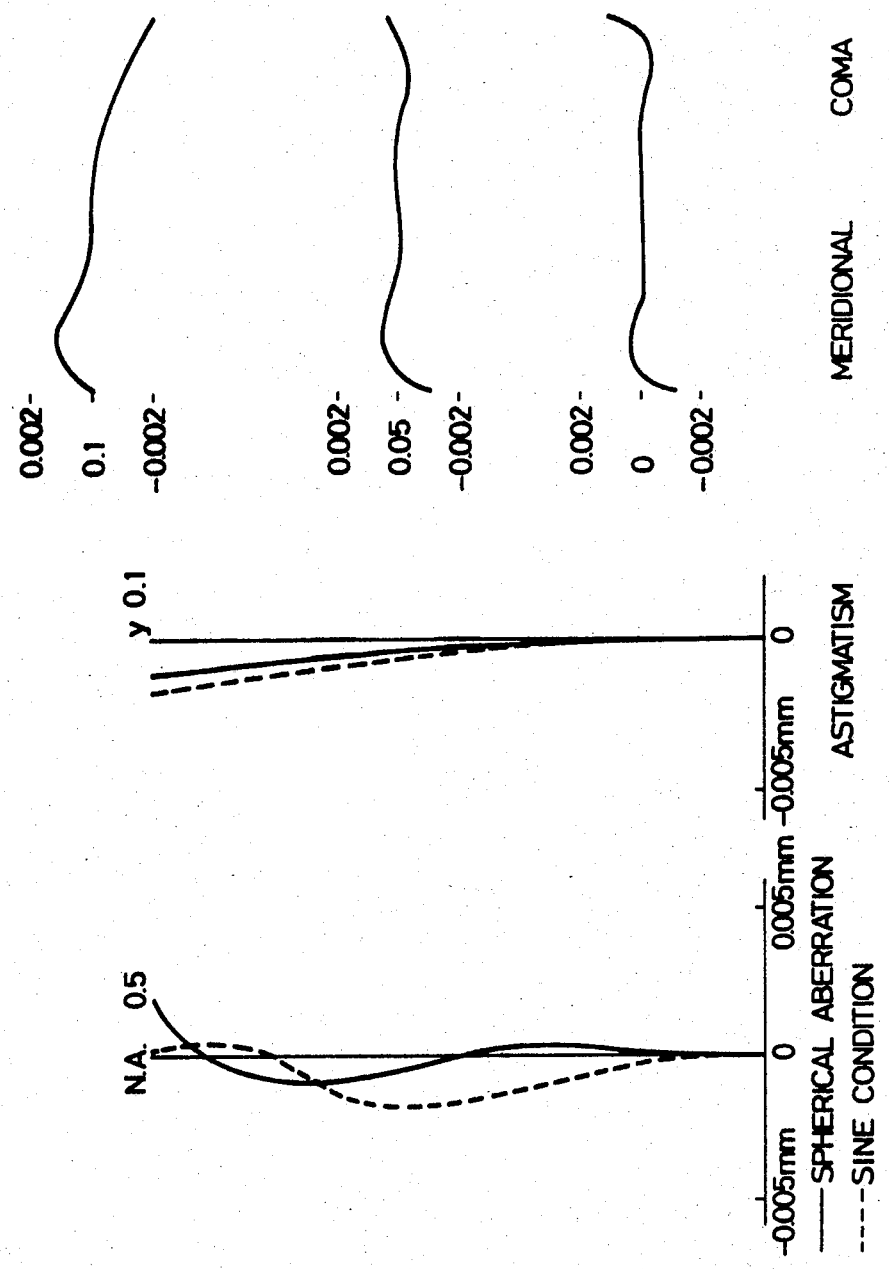
FIGS. 2 through 5 respectively show graphs illustrating aberration curves of Embodements 1 through 4 of the large-aperture lens according to the present invention.
Figure 3:
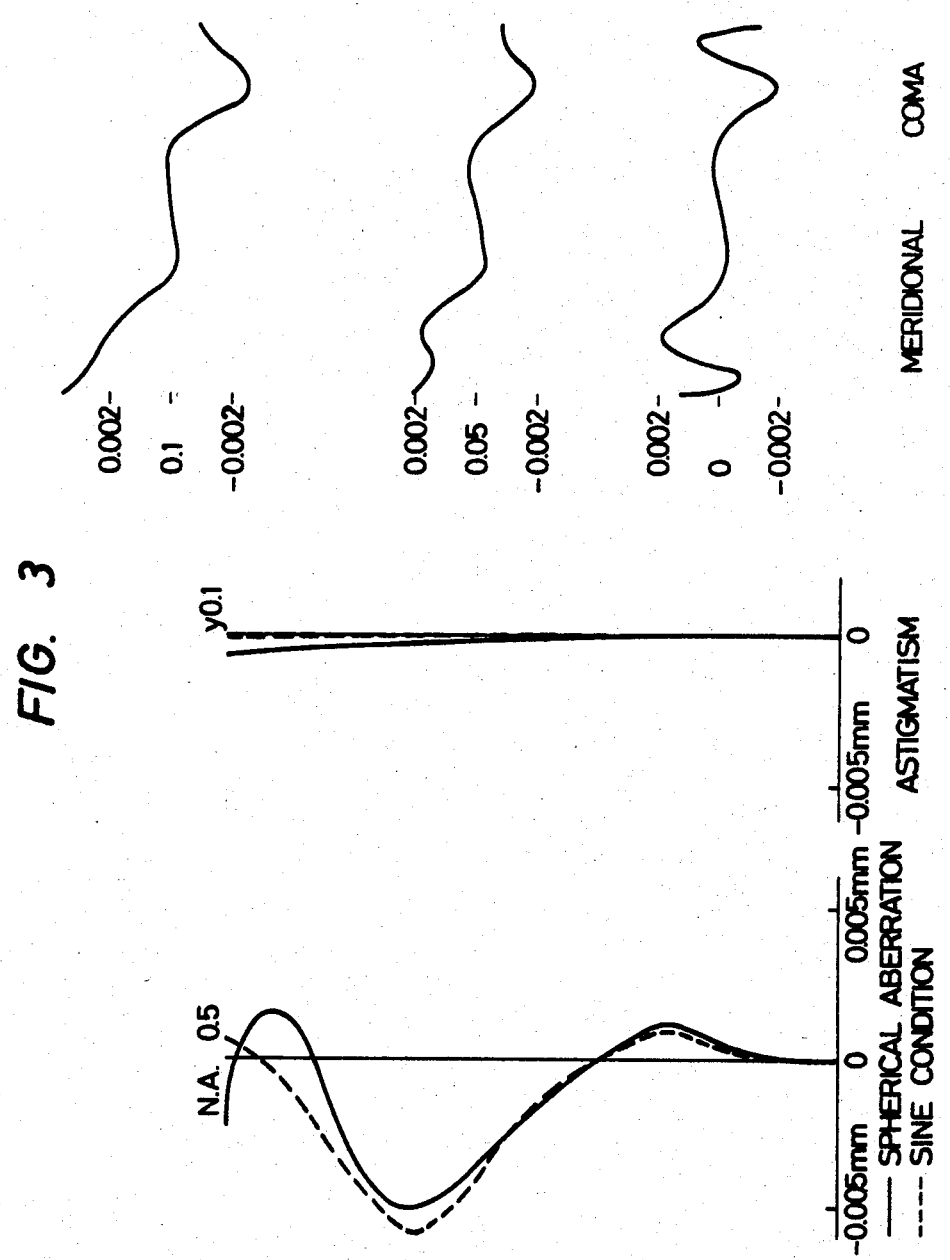
Figure 4:
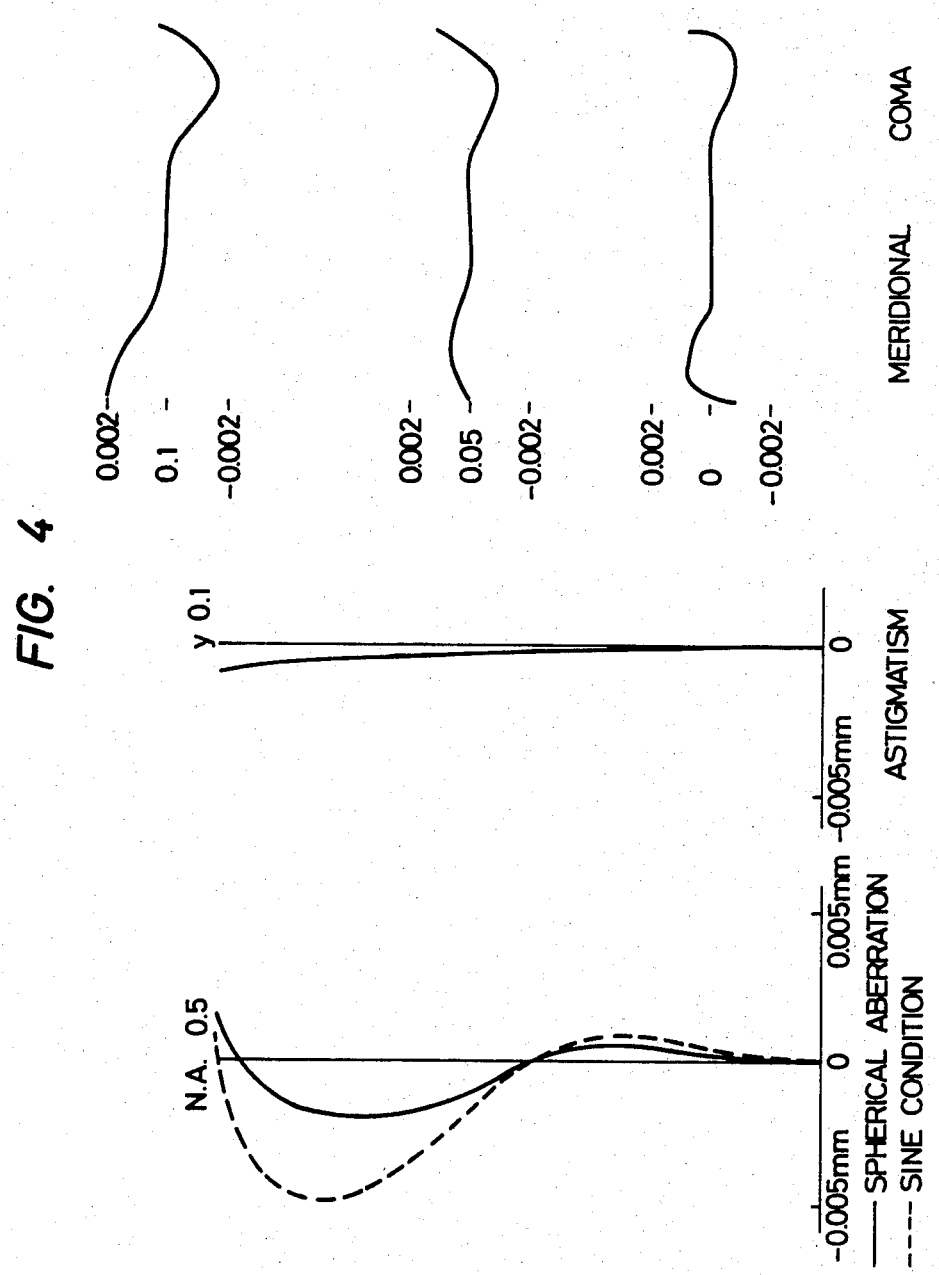
Figure 5:
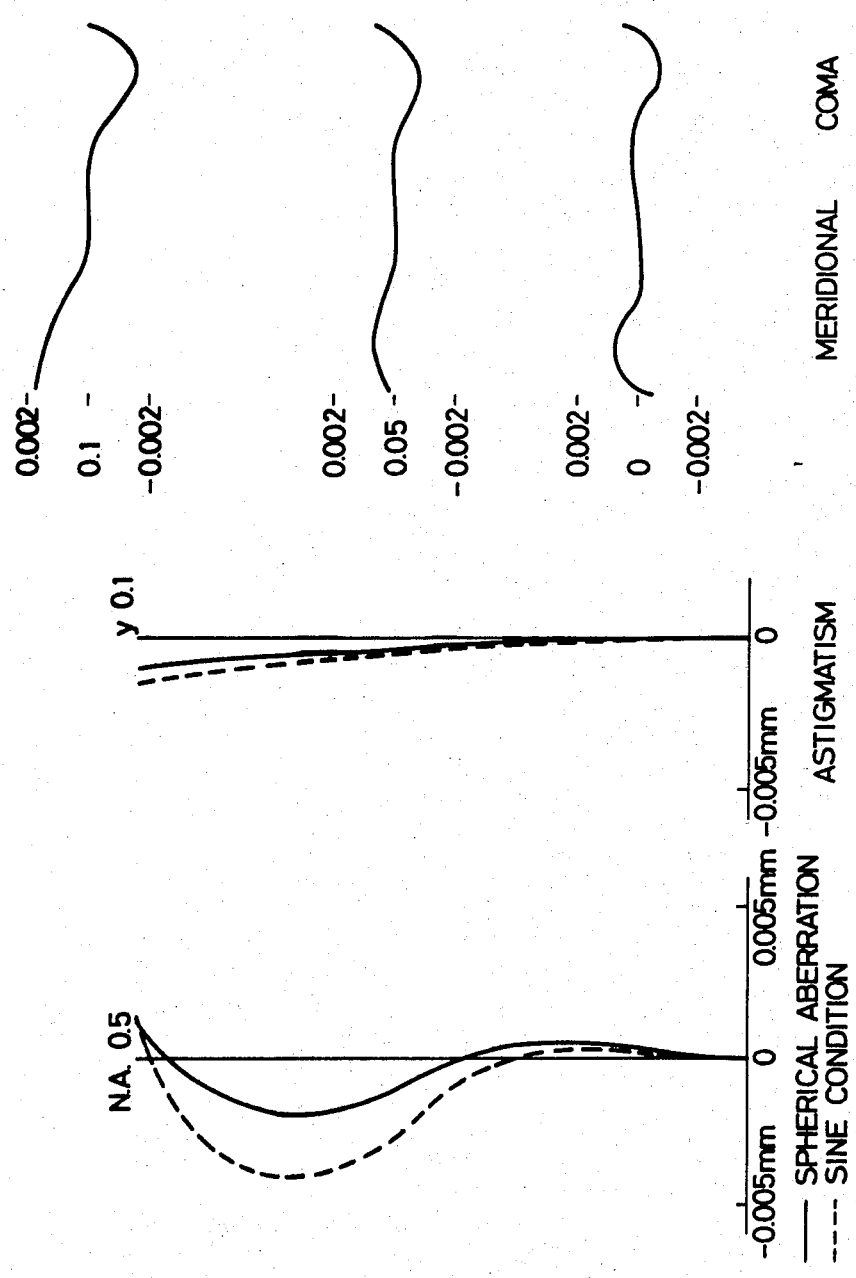

The single lens with aspherical surfaces according to the present invention has a sectional shape as shown in FIG. 1 and both refractive surfaces thereof have positive refractive powers.

The shape of an aspherical surface is generally expressed by the following formula:

$$x = \frac{ch^2}{1 + \sqrt{1 - (1+k)c^2h^2}} + \sum_{i=2} A_{2i} h^{2i}$$

where, x: Distance of a point on an aspherical surface at height h from the optical axis from a tangential plane at the apex of the aspherical surface h: Height from the optical axis c: Curvature at the apex of aspherical surface ($=1/R$)

k: Constant of the cone $A_{2i}$: Coefficient of the aspherical surface of 2ith order (i represents an integer of 2 or over).

Rotary aspherical surfaces of the single lens according to the present invention are characterized in that they satisfy the following conditions:

$$1 < \frac{R_1}{(n-1)f} < 1.7 \tag{1}$$

$$-3 < k_1 < 0 \qquad (2)$$

where, $R_1$: Radius of curvature of first surface ($=1/c_1$)
$R_2$: Radius of curvature of second surface ($=1/c_2$)
$k_1, k_2$: Constants of the cones of first and second surfaces
f: Focal length of the lens
n: Refractive index of the lens When the value defined by the condition (1) becomes smaller than the lower limit of the condition (1), the refractive power of the first surface becomes too strong compared with the second surface, the back focus becomes short, and it is impossible to obtain the desired working distance. On the contrary, when the value defined by the condition (1) becomes larger than the upper limit of the condition (1), it is impossible to favourably correct the large spherical aberration caused by the second surface. That is, when coaxial spherical aberration is corrected, zonal aberration becomes large and the maximum zonal spherical aberration remains unallowably undercorrected. When one tries to correct the maximum zonal spherical aberration, the intermediate zonal spherical aberration is left with an unallowably large value. Even when one attempts to correct those residual aberrations by using coefficients of an aspherical surface of higher order, the effect is small and, moreover, absolute values of the coefficients of the aspherical surface of an higher order become large. As a result, the manufacturing method of the lens becomes difficult.

The condition (2) is established for the purpose of favourably correcting spherical aberration of an higher order. If $k_1$ becomes smaller than the lower limit of the condition (2), spherical aberration of an higher order is overcorrected. When axial spherical aberration is corrected, the maximum zonal spherical aberration remains unallowably overcorrected. Even when one tries to correct it by using a coefficient of aspherical surface of higher order, the effect is small and, moreover, the absolute value of the coefficient of aspherical surface of an higher order becomes large. As a result, the manufacturing method of the lens becomes difficult. When, on the contrary, $k_1$ becomes larger than the upper limit of the condition (2), higher order aberration is undercorrected and it becomes impossible to correct aberration favourably due to the reason converse to the case that $k_1$ is smaller than the lower limit.

For practical use, it is preferable that the single lens according to the present invention further satisfies the following condition.

$$K_2 < -1 \qquad (3)$$

This is the condition for correction of coma. When $k_2$ becomes larger than the upper limit of the condition (3), coma of higher order occurs and the difference between the sine condition and spherical aberration becomes large in the maximum zonal portion or intermediate zonal portion. As a result, coma remains when spherical aberration is corrected, the effect of error in mounting becomes large, and the lens does not suit a practical use.

For easier polishing and easier measurement of the shape of lens surfaces and for easier centering, it is preferable to form the second surface of the lens as a surface of the second degree. Because of the condition $k_2 < -1$, said surface of second degree becomes a hyperboloid. In this case, it is necessary to further satisfy the following conditions in addition to the conditions described so far.

$$\frac{R_1}{(n-1)f} < 1.5 \qquad (1')$$

$$0.5 < k_2 \left( \frac{f(n-1)}{R_2} \right)^3 < 1.5 \qquad (4)$$

The condition (1') is the same as the condition (1). However, as the second surface of the lens is formed as a hyperboloid, the upper limit is made more strict.

The condition (4) is established for the correction of coma. When the value defined by the condition (4) becomes smaller than the lower limit thereof, coma remains undercorrected. When the value defined by the condition (4) becomes larger than the upper limit thereof, coma remains overcorrected. Therefore, the lens becomes susceptible to an error in lens mounting.

When the formula of aspherical surface is developed as a polynomial of h, it becomes as shown below.

$$x = \tfrac{1}{2}ch^2 + \{\tfrac{1}{8}(1+k)c^3 + A_4\}h^4 + \left\{ \frac{1}{16}(1+k)^3c^5 + A_6 \right\}h^6 + \ldots .$$

To correct spherical aberration of the third order, the first surface needs to satisfy the following condition (5) when the conditions (1), (2) and (1') are fulfilled:

$$-0.1 < \{\tfrac{1}{8}(1+k_1)c^3 + A_4^{(1)}\}(n-1)^2 < -0.05 \qquad (5)$$

where, $A_4^{(1)}$ represents the coefficient of an aspherical surface of the fourth order. Spherical aberration of the third order is overcorrected when the value defined by the condition (5) becomes smaller than the lower limit thereof and is undercorrected when said value becomes larger than the upper limit thereof. Therefore, it is necessary to select $A_4$ so that the condition (5) is fulfilled.

When the single lens according to the present invention is arranged to further satisfy the following condition (6), where d represents the lens thickness, it is also possible to correct astigmatism in addition to the aplanatic condition.

$$1.45 < \frac{d}{(n-1)f} < 1.65 \qquad (6)$$

Astigmatism is undercorrected when the value defined by the condition (6) becomes smaller than the lower limit thereof and is overcorrected when said value becomes larger than the upper limit thereof. In the case of the method of swinging a galvanometer for the purpose of tracking of video disk, it is necessary to obtain the limit resolving power in a wider range of field angle compared with the case when the objective is swung directly. When the condition (6) is satisfied, it is possible to meet this requirement.

Preferred embodiments which fulfil the above-mentioned conditions are shown in the tables below. In these tables, respective embodiments are arranged as lenses with f=4.3 mm in respect to the wave length of 0.78 μm, and meanings of respective reference symbols are as shown below.

$R_1, R_2$: Radii of curvatures of first and second surfaces d: Lens thickness $k_1, k_2$: Constants of cones of first and second surfaces $A^{(1)}_{2i}$: Coefficient of aspherical surface of 2ith order for first surface $A^{(2)}_{2i}$: Coefficient of aspherical surface of 2ith order for second surface l: Thickness of cover glass or protective layer, when refractive index in respect to wave length 0.78 μm is regarded as 1.51072

W.D.: Working distance.

---

Embodiment 1
$R_1 = 2.724904$    $d = 3.18473$    $n = 1.58$
$R_2 = -16.80452$ $l = 1.2$    $W.D. = 1.66083$ $$\left( \frac{R_1}{(n-1)f} = 1.093 \right)$$

Coefficients of aspherical surfaces are as follows:

| First surface | Second surface |
|---|---|
| $k_1 = -0.249555$ | $k_2 = -28.7292$ |
| $A_4^{(1)} = -0.94191 \times 10^{-3}$ | $A_4^{(2)} = 0.89328 \times 10^{-2}$ |
| $A_6^{(1)} = -0.56808 \times 10^{-5}$ | |
| $A_8^{(1)} = -0.25926 \times 10^{-5}$ | |

Embodiment 2
$R_1 = 3.192124$    $d = 3.8795$    $n = 1.486012$
$R_2 = -3.646483$ $l = 1.2$    $W.D. = 1.79649$ $$\left( \frac{R_1}{(n-1)f} = 1.527 \right)$$

Coefficients of aspherical surfaces are as follows:

| First surface | Second surface |
|---|---|
| $k_1 -1.13264$ | $k_2 -7.29327$ |
| $A_4^{(1)}\ 0.40055 \times 10^{-3}$ | $A_4^{(2)} -0.61172 \times 10^{-2}$ |
| $A_6^{(1)}\ 0.11040 \times 10^{-4}$ | |
| $A_8^{(1)} -0.82616 \times 10^{-4}$ | |
| $A_{10}^{(1)}\ 0.15760 \times 10^{-5}$ | |

Embodiment 3
$R_1 = 2.646252$    $d = 3.2$    $n = 1.486012$
$R_2 = -6.008379$ $l = 1.2$    $W.A. = 1.80504$ $$\left( \frac{R_1}{(n-1)f} = 1.266 \right)$$

Coefficients of aspherical surfaces are as follows:

| First surface | Second surface |
|---|---|
| $k_1 = -1.12282$ | $k_2 = -21.4983$ |
| $A_4^{(1)} = 0.38773 \times 10^{-2}$ (Hyperboloid) | |
| $A_6^{(1)} = 0.71444 \times 10^{-4}$ | |
| $A_8^{(1)} = -0.71505 \times 10^{-5}$ | |

Embodiment 4
$R_1 = 3.371032$    $d = 4.0$    $n = 1.70214$
$R_2 = -14.76876$ $l = 1.2$    $W.D. = 1.40096$ $$\left( \frac{R_1}{(n-1)f} = 1.117 \right)$$

Coefficients of aspherical surfaces are as follows:

| First surface | Second surface |
|---|---|
| $k_1 = -2.41688$ | $k_2 = -149.999$ |
| $A_4^{(1)} = 0.62875 \times 10^{-2}$ (Hyperboloid) | |
| $A_6^{(1)} = -0.21838 \times 10^{-3}$ | |
| $A_8^{(1)} = 0.67164 \times 10^{-5}$ | |

We claim:

1. A large-aperture single lens with aspherical surfaces having both of a first surface and second surface formed as aspherical surfaces having positive refractive powers, said single lens with aspherical surfaces satisfying the following conditions:

$$1 < \frac{R_1}{(n-1)f} < 1.7$$

$$-3 < k_1 < 0$$

where, $R_1$: Radius of curvature of first surface ($= 1/c_1$)

$k_1$: Coefficient of cone of first surface f: Focal length of lens n: Refractive index of lens when said aspherical surfaces are expressed by the following formula:

$$x = \frac{ch^2}{1 + \sqrt{1 - (1+k)c^2h^2}} + \sum_{i=2} A_{2i}h^{2i}$$

where, x: Distance of point on aspherical surface at height h from optical axis from tangential plane at apex of aspherical surface h: Height from optical axis c: Curvature at apex of aspherical surface ($=1/R$)

k: Constant of cone $A_{2i}$: Coefficient of aspherical surface of 2ith order (i represents an integer of 2 or over).

2. A large-aperture single lens with aspherical surfaces according to Claim 1 further satisfying the following conditions:

$$k_2 < -1$$

where, $k_2$: Coefficient of cone of second surface.

3. A large-aperture single lens with aspherical surfaces according to Claim 2, wherein said second surface is arranged as hyperboloid and said single lens with aspherical surfaces further satisfies the following conditions:

$$\frac{R_1}{(n-1)f} < 1.5$$

$$0.5 < k_2 \left( \frac{f(n-1)}{R_2} \right)^3 < 1.5$$

where, $R_2$: Radius of curvature of second surface ($=1/c_2$).

4. A large-aperture single lens with aspherical surfaces according to claim 1, 2 or 3, wherein said first surface further satisfies the following conditions:

$$0.1 < \{\tfrac{1}{8}(1+k_1)c^3 + A_4^{(1)}\}(n-1)^2 < -0.05$$

when said formula x expressing the aspherical surface is developed as a polynomial of h as shown below:

$$x = \tfrac{1}{2}ch^2 + \{\tfrac{1}{8}(1+k)c^3 + A_4\}h^4 + \left\{ \frac{1}{16}(1+k)^3c^5 + A_6 \right\} h^6 + \ldots .$$

5. A large-aperture single lens with aspherical surfaces according to claim 1, 2, or 3 further satisfying the following condition wherein reference symbol d represents the lens thickness:

$$1.45 < \frac{d}{(n-1)f} < 1.65.$$

6. A large-aperture single lens with aspherical surfaces according to claim 4 further satisfying the following condition wherein reference symbol d represents the lens thickness:

$$1.45 < \frac{d}{(n-1)f} < 1.65.$$

* * * * *